United States Patent [19]
Luck et al.

[11] 3,858,517
[45] Jan. 7, 1975

[54] RECREATIONAL FACILITY

[75] Inventors: Jochen Luck; John Thorpe, both of Wetter, Germany

[73] Assignees: Demag, A.G., Duisburg, Germany; Karl Freiherr von Wendt, Gevelinghausen, Germany

[22] Filed: Mar. 16, 1973

[21] Appl. No.: 341,901

[30] Foreign Application Priority Data
Aug. 18, 1972 Germany............................ 2240647

[52] U.S. Cl..................... 104/69, 188/8, 280/12 AB
[51] Int. Cl................................................ A63g 1/00
[58] Field of Search.......... 272/56.5 SS; 280/56.5 R, 280/18, 12 R, 12 B; 104/69, 134; 188/8

[56] References Cited
UNITED STATES PATENTS

| | | | |
|---|---|---|---|
| 895,256 | 8/1908 | Goudron............................. | 280/18 |
| 2,742,288 | 4/1956 | Brunel.............................. | 272/565 SS |
| 3,291,486 | 12/1966 | Applegath..................... | 272/56.5 SS |
| 3,473,483 | 10/1969 | York..................................... | 104/69 |
| 3,690,265 | 9/1972 | Horibata................................ | 188/8 |

FOREIGN PATENTS OR APPLICATIONS
1,964,299  6/1971  Germany............................. 280/18

Primary Examiner—Robert R. Song
Attorney, Agent, or Firm—Mandeville and Schweitzer

[57] ABSTRACT

Disclosed herein is a recreational facility which allows users to slide down snow-free slopes. The new facility may be installed at ski slopes or the like for year long usage.

8 Claims, 16 Drawing Figures

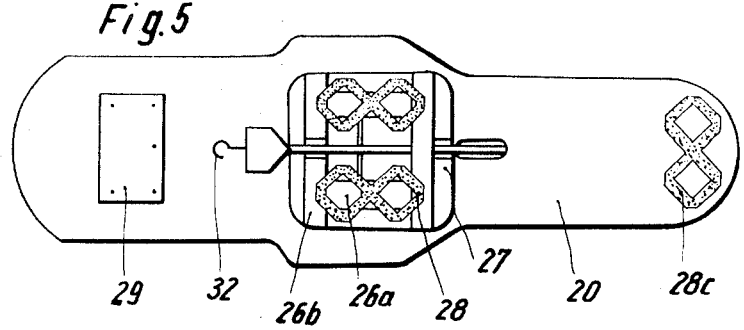
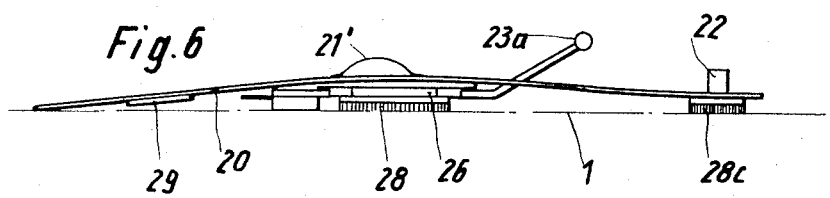
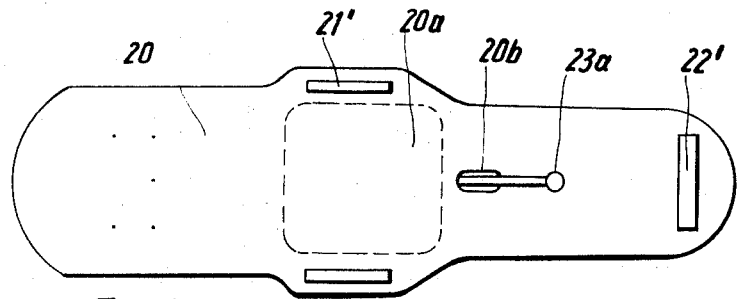
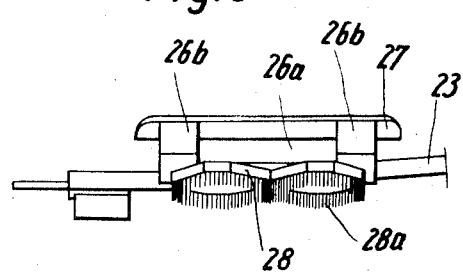
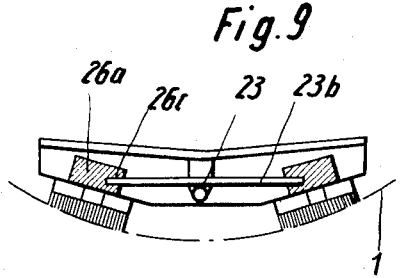

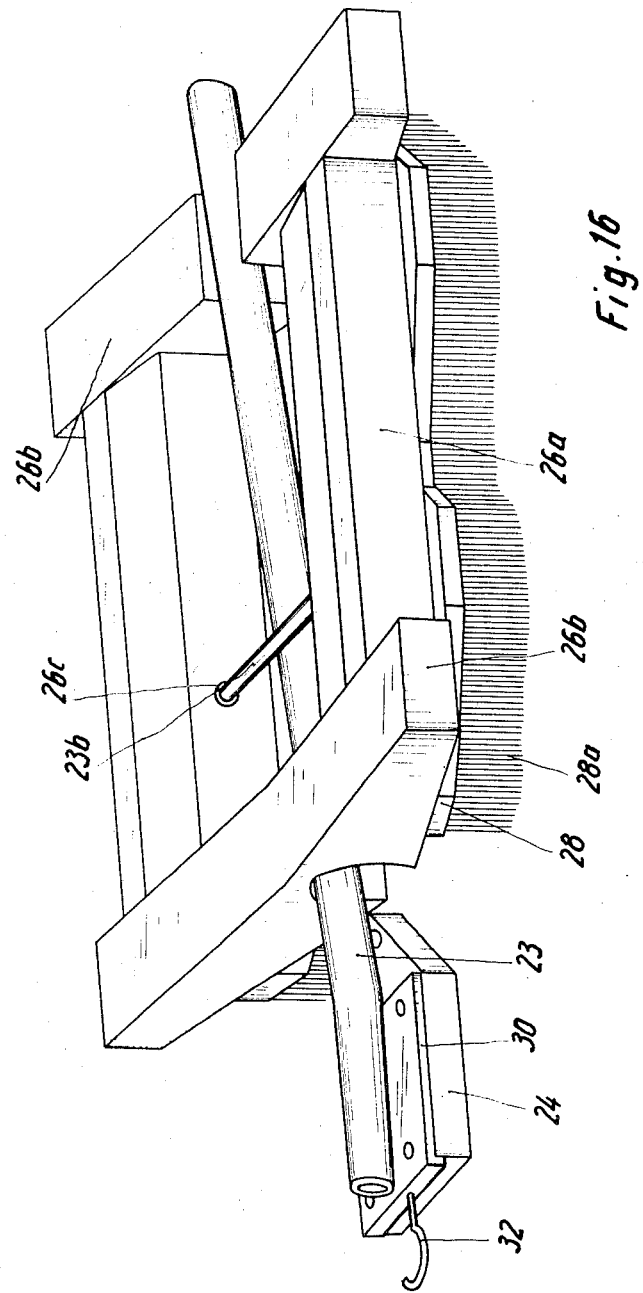

RECREATIONAL FACILITY

BACKGROUND AND SUMMARY OF THE INVENTION

Many passenger lifts designed to carry people are primarily used by skiers and are in use for a short period of the year only. Since many very charming mountain resorts have their tourist season only during the winter months and since the local lifts and inns are only in full use during this short period of the year, they tend not to be especially profitable.

Playgrounds have common children's slides which are used almost all year long. However, such slides are mounted on a structure which limits the total length of the slide.

The present invention is designed to increase the economy of passenger lifts, e.g., ski lifts. This may be done by building a long mountain slide at a ski slope, which slide consists of several straight and curved segments joined together and descending the entire mountain. The possibility of a unique downhill ride on the new slide will, of course, attract people to use the "ski" lift during the summer or non-snowy seasons.

In accordance with the invention, a simple and suitable support for the mountain slide, and an appropriate mat to sit on while sliding down an extended distance, as well as a device to return the mat to the top of the mountain all have been provided as part of the new recreational facility.

The new slide is erected at the slope and may be as the particular incline permits, e.g., a slide may be 1,000 meters long. The slide may be in operation during the entire year, and, therefore, it adds to the year-round operation of any lift and its economy.

The partly straight and partly curved segments of the new slide may be arranged in serpentines, whereby the segments with narrow curves have higher edges. An appropriate material for construction of the slide segments is asbestos concrete. This material is inexpensive, durable in bad weather, shock-resistant, and it has good gliding characteristics after treatment with wax or a similar material. Preferably, each segment has at its upper part an overlap reaching under the next segment going uphill. In case of settling of one segment or its footing, no step will be formed against which a passenger might slide, although a small drop may be created.

The sliding surface of the segments is hollowed out or dished and is bordered lengthwise by open bottom flanges arching upwards and with their bottom edges extending outwardly away from the sliding surface. This design makes the segments so solid that no longitudinal supports are required. Furthermore, the hollowed out sliding surface permits a pleasant and comfortable ride down the new slide.

The footings for the new slide normally consist of ties which rest on bars or stakes driven into or otherwise anchored to the ground. If the ground conditions permit, it is also possible to attach the ties to posts. Alternatively, the posts may be driven into the ground for use as footings. This is recommended when the slide travels over a depression in the terrain. When erecting a slide or part of it on a rocky surface, the footings may be in the form of concrete foundations.

According to another characteristic of the invention, the slide segments are attached to the footings by adjustable supports in order to compensate for any difference in height of the footings. Preferably, the segments rest with their arched edges on adjustable struts having rounded upper portions. Short pieces of pipe with a diameter approximately equal to that of the radius of the arched slide segment edges are suited for the support of the arched edges of the slide segments. The bearing surface of the slide will then be sufficiently supported to avoid any breaking of the asbestos concrete slabs. The struts are arranged on the footings in such a fashion that they swivel in all directions in order to fit any position, i.e., they are "universal," thus compensating for deviations in nominal height and lateral positioning of the footings.

In order to avoid undue movements in a completed slide and to secure slide segments against lifting off their anchorages, the strut supports may be specially connected with the flanges of the slide segments in accordance with another characteristic of the invention. This special support may be achieved by directing each strut through an opening in a butt strap fastened onto the slide flange, the apertured leg of the butt strap being positioned directly beneath the rounded supporting piece. The aperture diameter of the strap is larger than the strut diameter in order to allow for a limited movement of the slide in relation to the footing. With the butt strap arranged underneath the footing, the slide cannot lift off the strut, and, consequently, it cannot lift off the footing.

In accordance with a more specific detail of the invention, each strut is in the form of a threaded rod and the lower end (opposite the rounded upper supporting piece) thereof is threaded into a base tube provided with a mating thread. By selective rotation of the base tube, the total length of the strut may be changed to compensate for inaccuracies, deviations in height, etc. The base tube extends through an opening into a yoke-like fixture attached to the footing, and a lock inside the yoke prevents lifting off, e.g., a retaining ring may be arranged in a ring groove in the base tube for this purpose. The base tube has, at the end opposite the thread (its lower end), a convex bearing surface which always nests solidly on the footing if the strut orientation should vary slightly.

In accordance with the invention, in order to prevent the adjustable struts from improperly tilting sideways or downhill, the upper part of each strut may be connected by a stay or bracing with an adjacent footing or with the other end of the footing on which it rests. The stay or bracing is adjustable for precise alignment and orientation of each strut.

According to another characteristic of the invention, there are new and improved sleds for sliding down the new slide. These sleds may consist simply of mats with handles on each side. The handles may be simply leather straps suitably attached to the mats with tubular rivets, screws, or the like. As will be understood, the mats protect the clothing of passengers and, furthermore, prevent the marring of the slides which may be caused by shoes, particularly by heels. For the securing of feet and the eliminating of soiling of the slide, the mats may have foothold devices, such as pockets attached to the mats. By attaching ropes to the mats near the foothold devices, a passenger who has fallen backwards may readily straighten up by using the ropes.

Furthermore, the mats may be equipped with a brake shoe located at a central rear portion. In order to slow the sled down, the brakes may be pressed down. Specifically, the mats may have an indentation to which the brake shoe is attached. If a passenger leans back while sliding, it is inevitable that the weight of the body will push down on the brake shoe, thus establishing braking contact with the slide and reducing the speed of the sled automatically.

For comparatively short slides, the mat, as described previously, will suffice. These mats are not especially suitable for long slides with curves, where downhill sled speed has to be substantially reduced in the curves in order to meet safety requirements. Furthermore, the conditions of long slides are more likely to be affected by the weather, e.g., sections exposed to the sun have different friction properties than those in the shade. Recommended for such cases are sleds having their brake shoes attached to one end of a swiveling lever, the other end of which forms a handle. The brake may be activated at will to effect the amount of deceleration required.

The sled may comprise a frame provided on the bottom with glide linings, which frame forms a seat and accommodates the brake lever. The brake lever is mounted along the longitudinal axis of the sled and, therefore, in longitudinal direction of the frame with its handle end extending beyond the frame. The brake lever is pivoted on the frame between its handle end and brake shoe end.

The rear end (in the downhill or sliding direction) of the brake handle has a plate accommodating an interchangeable brake pad, preferably consisting of rubber. In order to improve braking properties, the bottom of the brake pad includes indentations comparable to the treads of car tires. The front (in sliding direction) of the brake plate is generally pointed, is downwardly bent, and is downwardly biased by a spring supported by the brake handle. The bent tip of the brake plate engages the slide surface, regardless of the angle of inclination of the brake handle due to the spring pressure, and deflects dirt and moisture, so that the effectiveness of the brake shoe is not reduced.

The top of the sled frame is equipped with a seat covered by a mat of felt or similar material, preferably extending over the frame in both longitudinal directions of the sled. The bottom of the frame is equipped with glide linings. These may consist of interchangeable plastic plates with plastic needles or bristles at the bottom. Plastic skids may also be utilized to advantage.

For a more complete understanding of the present invention and a better appreciation of its attendant advantages, reference should be made to the following description taken in conjunction with the accompanying drawings.

DESCRIPTION OF THE DRAWINGS

FIG. 5 is a bottom view of an alternate embodiment of a sled for use with the new slide;

FIG. 6 is a side elevational view of the sled of FIG. 5;

FIG. 7 is a top plan view of the sled of FIG. 5;

FIG. 8 is a longitudinal view of a sled frame for use with the new slide;

FIG. 9 is a transverse cross-sectional view of the sled frame of FIG. 8;

FIG. 16 is a perspective view of a new sled frame embodying the inventive principles and adapted for use on the new slide.

DETAILED DESCRIPTION OF THE INVENTION

Figure 1:
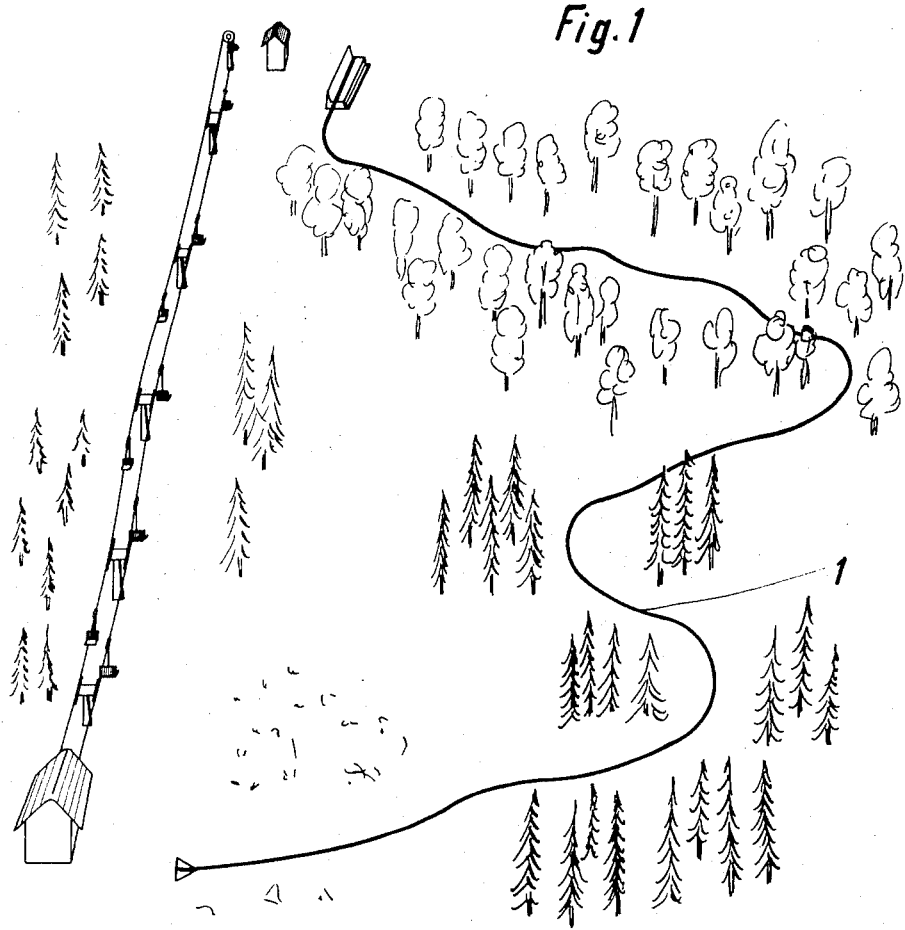
FIG. 1 is a schematic view of the new slide installed at a mountain slope.
Figure 2:
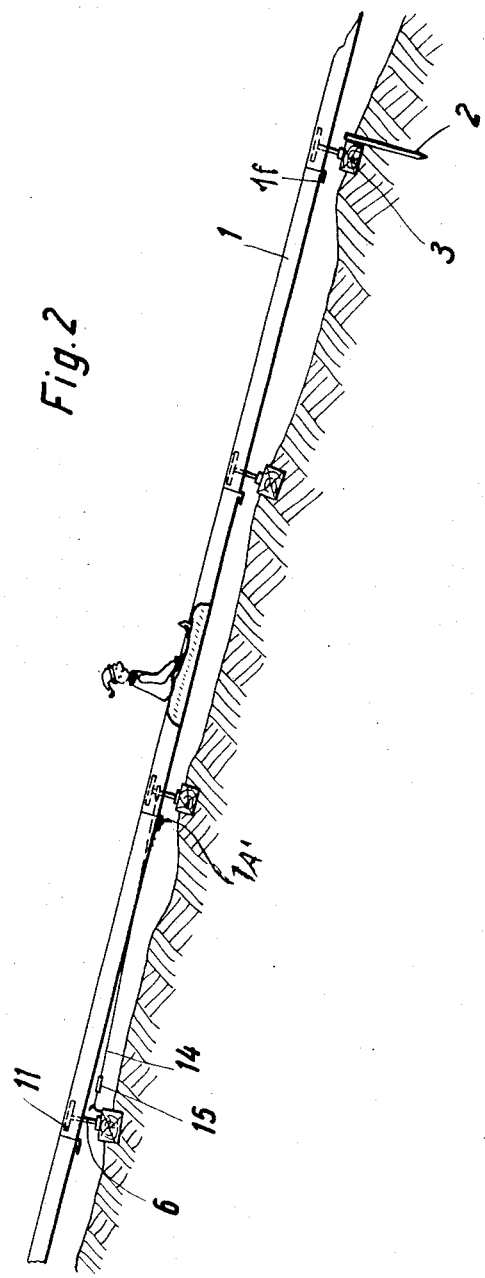
FIG. 2 is a side elevational view of the new slide.
Figure 3:
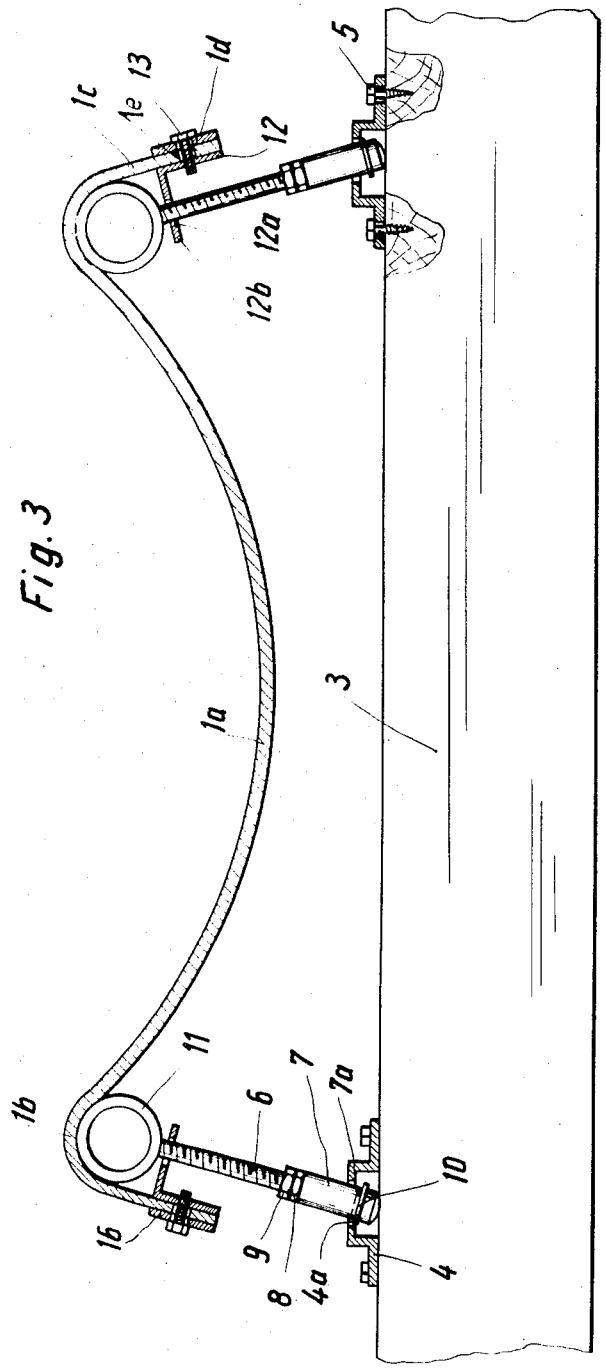
FIG. 3 is a transverse cross-sectional view of a slide segment embodying the principles of the invention.

FIG. 1 shows a mountain slope with a "ski" lift leading to the top. Adjacent the upper terminal of the lift is an entrance for the new mountain slide 1 which runs with a proper inclination in a predetermined course among the trees. FIG. 2 shows the arrangement of the individual new slide segments on their supports. As illustrated in FIGS. 1 and 3, each segment of the slide 1 rests on both sides on struts 6 seated through base portions 7 in brackets 4 mounted on ties 3, which ties are secured against movement by rods 2 driven into the ground. Each strut 6 is connected to the tie 3 located immediately above or uphill thereof by a stay 14 consisting of a cable adjustable by means of a turnbuckle 15. Each segment of the slide 1 is overlapped at 1a providing support for the lower end of the next uphill segment.

FIG. 3 shows further that both sides of the hollowed out or dished slide surface 1a of slide 1 include rims 1b which arch upwards and continue in a flange 1c flared outwardly and downwardly from the slide surface. The arched rims 1b rest on rounded supports 11 which advantageously consist of pipes welded to the struts 6, which are advantgeously in the form of threaded rods. In order to keep the strut 6 connected to the slide 1, the flange 1c is provided with a butt strap 12 having a leg 12b directed inwardly and defining therein a hole 12a through which the strut 6 projects. In order to allow for minor lateral movements, the hole 12a has a diameter larger than the diameter of the strut 6. In order to avoid any failure of the slide, which preferably comprises asbestos concrete slabs, in the areas where the butt straps 12 are attached, the screws 13 for the attachment of the butt straps 12 are directed through reinforcing plates 16, so that any deleterious forces of the butt straps 12 are absorbed by the larger areas of the flanges 1c.

In order to adjust their elevations, the struts 6 are threaded into hollow, tubular base elements 7 provided with threaded adjusting nuts 8. Locking nuts 9 eliminate unintentional twisting of the base tubes 7. The lower end of each base tube 7 projects through an opening 4a of a yoke 4 which is attached to the ties by screw means 5. Below the opening 4a of the yoke 4, the base tube 7 is provided with a ring groove 7a, which contains a lift-off guard in the form of a retaining ring 10. The bottoms of base tubes 7 are convex to facilitate solid contact of the struts with the ties in all orientations thereof.

During assembly, the base tubes 7 with nuts 8, 9 are extended through the openings 4a of the yokes 4 which are then attached to ties by screws 5. Butt straps 12 are pushed over the struts 6, and the lock nuts 9 are threaded on. After threading the struts 6 into the nuts 8 of the base tubes 7, the arched rims 1b of slides 1 may be rested on the pipes 11. By rotating the base tubes 7, the height of each slide segment 1 may be precisely adjusted. Then the butt straps 12 may be attached to flanges 1c by screw means 13. The use of the plate 16 makes it possible to choose holes 1d for screws 13 considerably larger than the screw diameter. Each of the segments of the slide 1 may be supplied by the manufacturer with preformed holes 1d. The stays 14, previously mentioned, may then be adjusted to tension the upper ends of struts 6 through the screws 13 and butt straps 12. The stays 14 are tightened by twisting turnbuckles 15, as will be understood.

Figure 4:
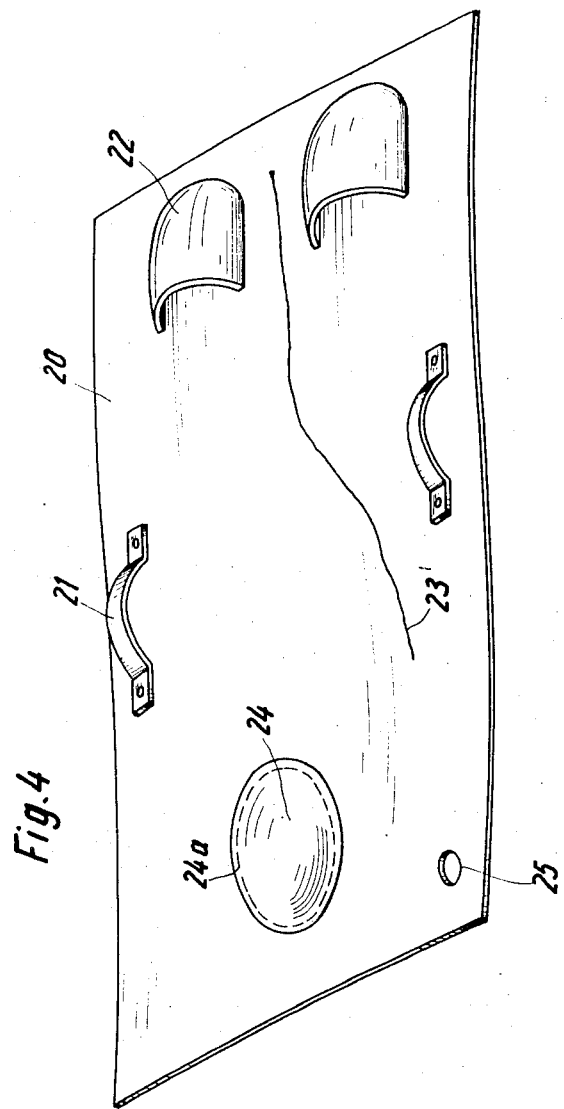
FIG. 4 is a perspective view of a simple sled adapted for use with the new slide.

For sliding down the new slide 1, passengers may use the sled down in FIG. 4, or, if the new slide has been installed on a slope with a steep incline, the sled of FIGS. 5–16, provided with a better brake, may be utilized. A mat 20, the sled of FIG. 4, is made of sheet material, such as felt, etc., and has at its front two foothold devices 22 developed as two attached pockets. At both side edges, a handle 21 is riveted to the mat. At the opposite end, the center of the mat has an indentation 24a which is covered by brake shoe 24. When pressure is exerted on the brake shoe 24, it is depressed, and its rough bottom will establish frictional braking contact with the slide surface 1a. Between the foothold devices 22, a rope 23' is secured to the mat 20. One corner of the mat is provided with a grommet 25 through which the mat may be hooked into the lift for transport uphill, as will be understood.

FIGS. 5–7 and 16 show another embodiment of a sled suitable for use with the new slide. This sled includes a frame 26, the bottom of which is equipped with a gliding surface 28. The frame has a seat 27 on top which is covered by a mat 20' extending beyond the frame on both sides in the longitudinal direction. the frame, seat and mat are connected with each other. The mat consists of felt or another appropriate, preferably textile, material. Above the seat 27, the mat is equipped with handles 21' on each side. A passenger sitting down on the seat 20a (FIG. 7) of the sled may hold on easily. In front of the seat is a brake lever 23' on the center axis of the sled, which lever extends through opening 20b in the mat. The brake lever 23 has a front portion bent upwardly and pivots on frame 26 about a horizontal axle 23b (FIGs. 9 and 16).

Figure 10:
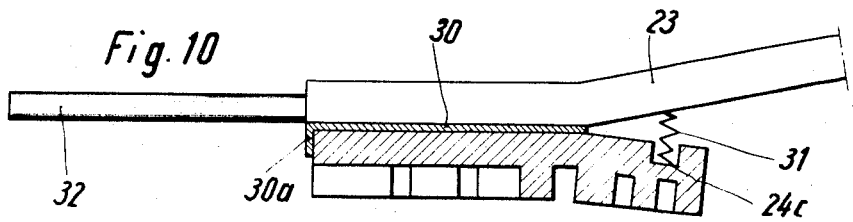
FIG. 10 is a longitudinal cross-sectional view of a brake shoe for use with the sleds of the invention.
Figure 11:
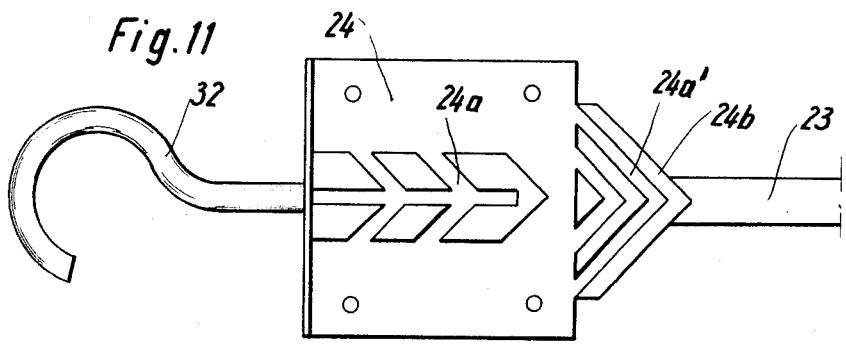
FIG. 11 is the bottom view of the brake shoe of FIG. 10.

The rear end of the brake lever, as shown in FIGS. 10 and 11, is equipped with a reinforcement plate 30 which has a brake lining 24' attached to it. The back edge 30a of the reinforcement plate 30 is bent down. The brake lining 24' is provided with hollows 24a. The front edge (in the downhill or sliding direction) is extended by a triangular portion 24b of the brake lining, which is not attached to the reinforcement plate 30, but is biased downwardly by a spring 31 acting against the lever 23. The spring 31 is engaged in the hollow 24c of the brake lining portion 24b. As shown, the brake lining portion 24a is also provided with hollows.

In order to decelerate the speed of the sled, the passenger on the sled merely exerts an upward pull on the handle 23a. This causes the brake lining 24', arranged at the opposite end of the brake lever, to be pressed against the slide. As the brake lever is arranged in the longitudinal center of the sled, the sled maintains its direction while slowing down. The purpose of the wedge-shaped extension 24a' of the brake lining (FIGS. 10, 11) is to rid the slide surface in front of the brake lining 24' of contamination.

As shown in FIG. 16, lateral axle 23b traversing the brake lever 23 is engaged in bores 26c located inside longitudinal members 26a of the frame. The cross pieces 26b of the frame correspond generally to the cross-sectional profile of the slide. Both cross pieces 26b have an opening through which the brake lever 23 extends. The opening in the front cross piece 26b is at the top, while the opening in the rear cross piece is at the bottom; both openings serve to limit excessive movement of brake lever 23.

Figure 12:
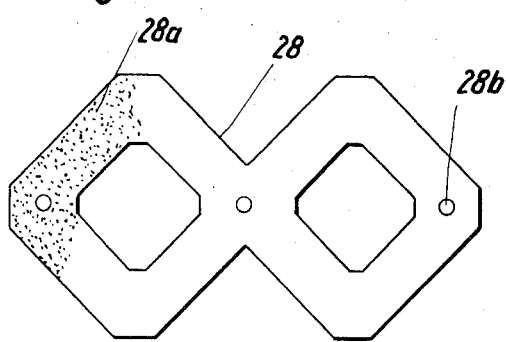
FIG. 12 is a bottom view of a glide lining of the new sleds.
Figure 13:
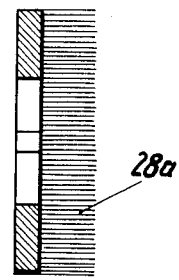
FIG. 13 is a cross-sectional view of the new glide lining of the invention.

As shown in FIGS. 5, 6, 8 and 9, the glide linings consist of plastic plates 28 provided with needles or bristles 28a. An advantageous design of such linings, which are attached to frame 26 and which may be interchanged, if desired, is shown in FIGS. 12 and 13. On FIG. 12, reference numeral 28b indicates the holes provided in the plastic plate 28 for attachment of the lining.

Figure 14:
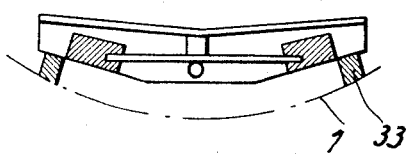
FIG. 14 is a transverse cross-sectional view of a new sled having two skids.
Figure 15:
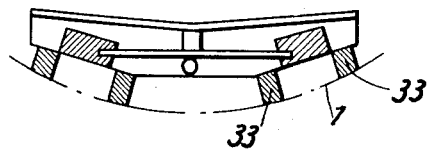
FIG. 15 is a transverse cross-sectional view of a new sled having four skids.

In order to properly position the gliding surfaces perpendicularly with the hollowed out slide 1, the bottom portions of longitudinal 26a and cross pieces 26b of the frame are, as shown in FIGS. 8, 9 and 16, arranged in cross section so that the gliding surfaces rest vertically on the slide. Alternatively and as shown in FIGS. 14 and 15, skids 33, made of an appropriate plastic material, may be attached beneath the frame 26 to serve as gliding surfaces.

As shown in FIGS. 5–7, the mat 20 extends sufficiently beyond the frame 26 in the sliding direction (downhill) to accommodate the feet of the passenger on the mat. The feet are supported by a shoulder 22' transverse to the mat, beneath which shoulder is disposed another glide lining 28c. The elongated mat 20 serves several purposes. First of all, it facilitates the attachment of a simple but reliable additional brake 29, which is effective when the passenger falls off the sled; secondly, the passenger's feet are supported securely, even though the frame of the sled is very short, and, therefore, very effective in curves. Furthermore, the extended parts of the mat act as buffers or bumpers in case a sled collides with another sled traveling at a lower speed. Still further, the sled requires less space for storage when it is not in use.

It should be understood that the slide and sled structures of the invention herein illustrated and described are intended to be representative only, as certain changes may be made therein without departing from the clear teachings of the disclosure. Accordingly, reference should be made to the following appended claims in determining the full scope of the invention.

We claim:

1. A recreational facility installed at a mountain slope including a passenger lift comprising an elongated slide means installed at said slope and consisting of a plurality of straight and curved prefabricated slide segments joined together in a predetermined downhill course, and a sled means for traversing said elongated slide means, said sled means comprising a. an elongated mat-like means having passenger supporting means at upper surfaces thereof and course-engaging means at lower surfaces thereof;

b. brake shoe means disposed along the central longitudinal axis of said mat-like means;

c. said brake shoe means being selectively displaceable downwardly of said mat-like means to engage said course and to controllably retard the motion of said mat-like means; and d. actuating lever means mounting said brake shoe means at a lower end thereof and mounting a handle means at an upper end thereof.

2. A recreational facility or the like according to claim 1, further characterized by the fact that a. said mat-like means includes a frame provided on the bottom with a plurality of glide linings; and b. said frame including seat means to be used by a passenger.

3. A recreational facility or the like according to claim 2, further characterized by the fact that a. said lever means is mounted along a longitudinal axis of the sled means and said handle means is disposed on an upward slant;

b. said lever is mountend for pivoting movement about a horizontal axis;

c. said frame includes a pair of longitudinal members straddling said brake lever means;

d. an axle means extends between said longitudinal member along said horizontal axis.

4. A recreational facility or the like according to claim 3, further characterized by the fact that a. the lower end of said lever means is provided with a universal reinforcement plate means accommodating the interchangeable mounting of brake shoe means of varying configurations.

5. A recreational facility or the like according to claim 1, further characterized by the fact that a. said brake shoe means includes indentations for enhancing frictional contact with said course.

6. A recreational facility or the like according to claim 2, further characterized by the fact that a. said glide linings comprise plastic plates having vertical needles depending from the bottom surfaces thereof.

7. A recreational facility or the like according to claim 2, further characterized by the fact that a. said linings comprise plastic skid means.

8. A recreational facility or the like according to claim 7, in which a. said skid means are elongated members which straddle each of said glide linings.

* * * * *